United States Patent Office 3,275,676
Patented Sept. 27, 1966

3,275,676
PROCESS FOR PREPARING CYCLOBUTENE-1,2-DICYANIDE
Janice L. Greene, Warrensville Heights, Norman W. Standish, Shaker Heights, and Nancy R. Gray, Cleveland Heights, Ohio, assignors to The Standard Oil Company, Cleveland, Ohio, a corporation of Ohio
No Drawing. Filed Sept. 30, 1963, Ser. No. 312,313
3 Claims. (Cl. 260—464)

This invention relates to a new chemical, namely, cyclobutene-1,2-dicyanide, having the following formula:

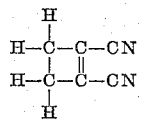

The new compound can be made by dechlorinating either the cis or trans form of cyclobutane-1,2,-dichloro-1,2-dicyanide in accordance with the following reaction:

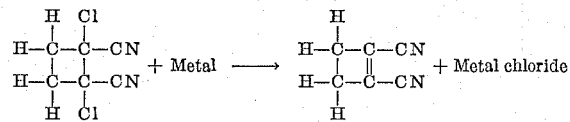

Any metal which forms a halide can be employed in the process.

The following examples will illustrate a method for preparing the compound.

Example I

In a 500 ml. flask fitted with stirrer, dropping funnel and reflux condenser (topped by a drying tube containing anhydrous $CaSO_4$) was placed 12 g. (0.262 mole) of Zn-Cu couple prepared as in Org. Synthesis 41, 72, together with 200 ml. anhydrous ether. 43.5 g. (0.25 mole) trans - cyclobutane-1,2-dichloro-1,2-dicyanide dissolved in 50 ml. anhydrous ether was added via the dropping funnel. This mixture was refluxed for 198 hours and then vacuum-distilled to give 7.5 g. (29% yield) of cyclobutene-1,2-dicyanide. The compound was a clear, viscous liquid having a boiling point of 57° C. at a pressure of 1 mm. of mercury.

Example II

A mixture of 50 grams of cyclobutane-1,2-dichloro-1,2-dicyanide and 30 grams of cyclobutane-1,2-dicyanide (functioning solely as a solvent) is placed in a flask equipped with a stirrer. To this stirred mixture is added 52 grams of Raney nickel in small increments. A mild exothermic reaction ensues and the temperature rises to about 110° C. After all of the Raney nickel has been added, the mixture is stirred for five minutes and then washed with anhydrous ether into a coarse sintered glass funnel. The solid remaining on the filter is washed repeatedly with ether until the filtrate is colorless. The filtrate is then refiltered through an ultrafine glass filter to remove any remaining small nickel particles. The filtrate is stripped to remove the ether and then vacuum-distilled to give 30 grams (76% yield) of the same compound as above having a boiling point of 45° C. at 0.4 mm. of mercury.

The compound in each example was identified by its carbon, hydrogen, and nitrogen content and the structure was confirmed by infrared spectra and nuclear magnetic resonance spectra.

The product is useful as a nematocide and can be applied to a nematode containing soil in any of the usual manners such as in a solvent or mixed with a solid carrier, such as clay, or as an ingredient of a fertilizer. The presence of the double bond adjacent the cyanide groups makes the compound particularly effective for this purpose. It may be applied at the rate of 1 to 20 pounds per acre in accordance with any of the well-known techniques for applying liquid nematocides.

We claim:

1. The method which comprises reacting cyclobutane-1,2-dichloro-1,2-dicyanide with a material selected from the group consisting of a zinc-copper couple and Raney nickel in a solvent and recovering as the product cyclobutene-1,2-dicyanide having the following formula

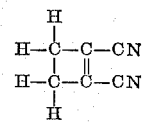

2. The method of claim 1 wherein the material is a zinc-copper couple and the solvent is ether.
3. The method of claim 1 wherein the material is Raney nickel and the solvent is cyclobutane-1,2-dicyanide.

References Cited by the Examiner

Finar, "Organic Chemistry," vol. 1, 1959, p. 59.
Heisig, J.A.C.S., 63 (1941), pp. 1698–1699.
Migrdichian, "Organic Synthesis," vol. 2, 1957, pp. 838–839.
Noller, "Chemistry of Organic Compounds," 1957 (2nd ed.), p. 128.

CHARLES B. PARKER, *Primary Examiner.*

JOSEPH P. BRUST, *Examiners.*